L. FELDMANN, Jr. & T. E. CRECELIUS.
WING OR LEAF FOR DISPLAY RACKS.
APPLICATION FILED APR. 6, 1912.
1,060,443.
Patented Apr. 29, 1913.
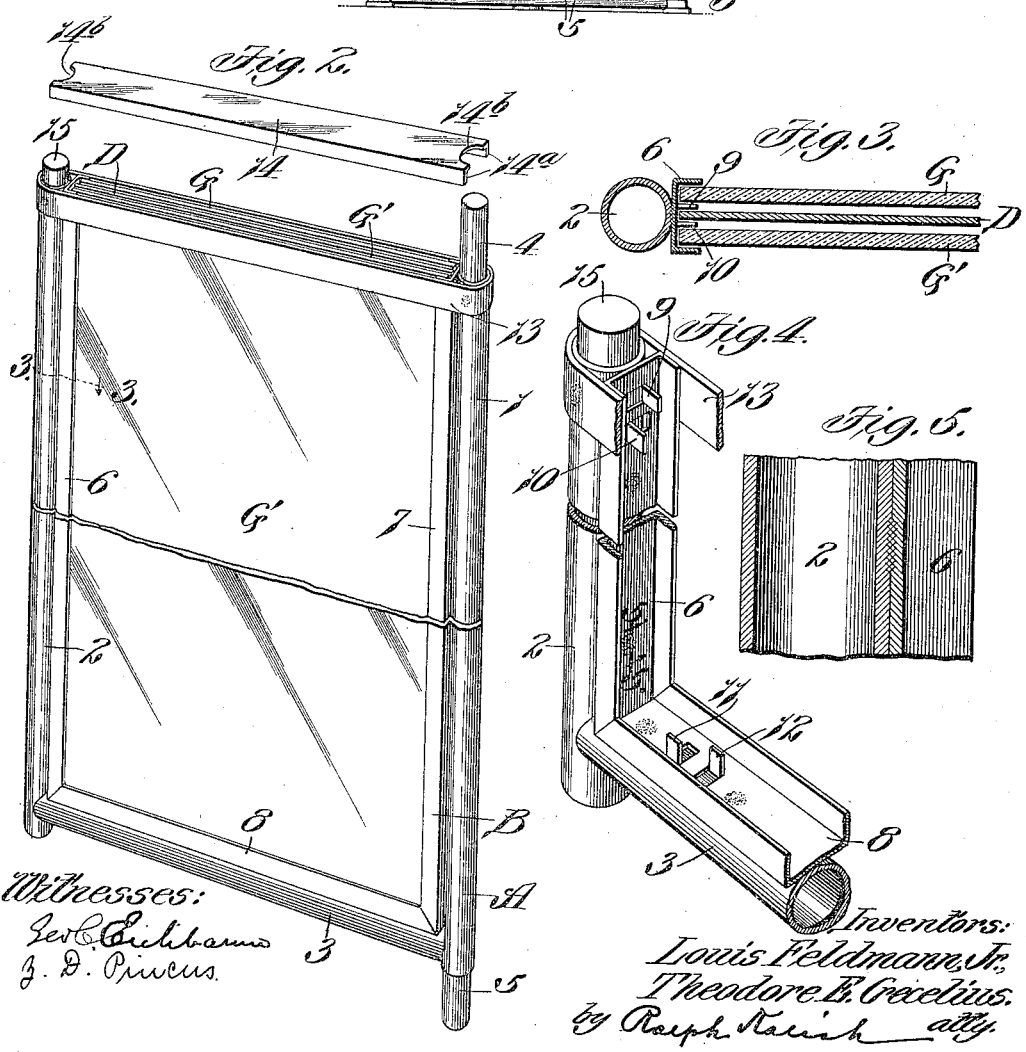

UNITED STATES PATENT OFFICE.

LOUIS FELDMANN, JR., AND THEODORE E. CRECELIUS, OF ST. LOUIS, MISSOURI, ASSIGNORS TO MULTIPLEX DISPLAY FIXTURE COMPANY, OF ST. LOUIS, MISSOURI, A CORPORATION OF MISSOURI.

WING OR LEAF FOR DISPLAY-RACKS.

1,060,443.  Specification of Letters Patent.  Patented Apr. 29, 1913.

Application filed April 6, 1912. Serial No. 689,028.

*To all whom it may concern:*

Be it known that we, LOUIS FELDMANN, Jr., and THEODORE E. CRECELIUS, citizens of the United States, residing at the city of St. Louis, State of Missouri, have invented certain new and useful Improvements in Wings or Leaves for Display-Racks, of which the following is a specification, reference being had to the accompanying drawings, forming a part hereof, in which—

Figure 1 is an elevational view of a supporting standard showing a plurality of our new wings operatively mounted and arranged thereupon; Fig. 2 is a perspective view of our new wing and its cap or cover-strip, the cap or cover-strip being shown separately or disassembled from the wing-body; Fig. 3 is a detail sectional view taken on the line 3—3, Fig. 2; Fig. 4 is an enlarged fragmentary view of our new wing with the display-matter and the transparent protective covers therefor removed; and Fig. 5 is a detail sectional view on the line 5—5, Fig. 4.

This invention relates to certain new and useful improvements in wings or leaves for display-racks and the like, the objects of our invention being to provide a wing or leaf of the kind stated which will be durable, strong, substantially unitary, and comparatively light in weight, and on and by which matter may be removably displayed, and while exposed to view, be protected from injury, dust, dirt and the like, and to improve generally upon articles of the kind stated.

With these objects in view, our invention resides in the novel construction of the several parts of our new wing or leaf and in the novel arrangement and combination of the same, all as will hereinafter be described and afterward pointed out in the claims.

In the drawings, A indicates the outer or main frame of our new wing or leaf. This outer frame A is made up of or comprises upright or vertically-disposed preferably hollow metallic rods or bars 1 and 2, and a horizontally-disposed connecting member 3 likewise preferably a hollow metallic rod or bar extending between upright bars 1 and 2 at or adjacent their lower ends, as shown particularly in Fig. 2. These members or bars provide what might be called an approximately U-shaped frame, and while the said members or bars 1, 2, and 3 may be firmly connected and secured together in any suitable manner and by any suitable means, yet we prefer to electrically weld the same together and thereby provide a substantially unitary rigid and strong outer frame. Inserted and suitably secured in said bar or rod 1 at its upper and lower ends are suitable preferably metallic pivots or trunnions 4 and 5, respectively, whereby said wing is adapted to be pivotally or swingably mounted in a suitable supporting standard or rack S provided with alining upper and lower parallel members or bars S' and S'', respectively. Preferably pivot 4 is somewhat longer than pivot 5, pivot 5 being adapted to rest in a recess or the like provided in said lower cross-bar or member S'' of said standard S and said pivot 4 being adapted to be inserted into and extend through a perforation in the upper cross-bar or member S' of standard S, whereby said leaf or wing may be easily removed from operative position in said standard, as will be readily understood. Fitting and arranged within the area of, and rigidly fixed to said frame A is an inner frame B. This inner frame B is made up of or comprises vertically-disposed preferably metallic channel-shaped members 6 and 7 and a similar metallic channel-shaped horizontally-disposed connecting member 8 extending between, and integral or otherwise suitably connected to, said members 6 and 7 at their lower ends, as shown particularly in Figs. 2 and 4. The flanges of said vertically-disposed members 6 and 7 and of said horizontally-disposed member 8 are presented inwardly and upwardly, respectively, whereby there is provided a substantially U-shaped frame or pocket for removably receiving and holding the protective covers G and G' and therebetween the matter D to be displayed, as shown particularly in Fig. 2. While said inner frame B may be suitably secured in proper operative position in frame A in any suitable manner and by any suitable means, we prefer to electrically spot-weld the same to frame A, as shown, whereby there is provided an all metallic, substantially U-shaped unitary wing or leaf having a flanged pocket for receiving and removably holding the matter to be displayed. Each of said vertically-disposed members 6 and 7 of frame B is provided adjacent its upper end with two preferably integral prongs 9 and 10 spaced a suitable distance apart and preferably staggered relatively to each other, as shown, said prongs being preferably cut out from, and bent upwardly at right angles to, the body portion of said members. Said horizontally-disposed member 8 is likewise provided adjacent each of its ends with a pair of similar prongs 11 and 12 likewise spaced apart and preferably staggered relatively to each other, as shown, prongs 10 and 11 being in vertical alinement and prongs 9 and 12 being likewise in vertical alinement. When the protective covers G and G', which are of any suitable transparent material, such as, preferably sheets of glass, are to be placed in operative position in inner frame B, these prongs are adapted to act or serve as guides, the transparent cover G being received and guided into position between prongs 9 and 12 and the side flanges of said members 6, 7 and 8, and said transparent cover G' being received and guided into position between said prongs 10 and 11 and the side flanges of said members 6, 7 and 8; and afterward said prongs are adapted to hold said covers spaced apart in frame B to provide a space therebetween for receiving and holding the matter to be displayed.

In constructing our new wing, said members 1, 2 and 3 are first preferably welded together to form said frame A. Said members 6, 7 and 8 are then suitably secured together or, if in one piece of material, bent to provide said frame B. Said prongs 9, 10, 11, and 12 (and also the prongs at the other end of said member 8 and the prongs on said member 7, not shown, having reference particularly to Fig. 4) are then punched and bent at right angles to said members, when said frame B is then fitted and secured, preferably by spot-welding, within and to frame A. To prevent said frames A and B spreading at their upper end, we preferably arrange therearound a suitable connecting or strengthening strip or band 13, said strip extending therearound as shown particularly in Fig. 2 and being suitably secured, preferably by spot-welding, to said members 1 and 2 of frame A.

As will be seen, the inner frame B provides what might be called an elongated rectangular pocket for removably receiving and holding the said protective covers G and G' and the matter D to be displayed therebetween. As will further be seen, the display-matter D is exposed to view from both sides of the wing and is protected by said covers from being injured or becoming soiled by dust, dirt and the like, the said covers being also protected from injury or breakage at their edges by said members 6, 7 and 8 of frame B, and in order to prevent the entrance of dust and the like, at the top of said pocket and to also protect said covers and matter displayed at their top edges, a suitable cap or cover-piece 14 provided with suitable flanges 14$^a$ and cut-out at its ends as at 14$^b$, is provided, said cap or cover-piece 14 being adapted to neatly fit on and over the top of inner frame B and said band or strip 13; and to present an attractive appearance at the upper front part of the wing, a plug or member 15 of any desired shape or configuration may be inserted into the upper end of bar 2.

Our new wing may be easily manufactured, is extremely strong and durable, and, when the several parts are welded together as we have here described, is a substantially unitary rigid structure; and the matter D to be displayed may be easily placed in, or removed from, exposing position in frame B and, when in such position on frame B, is exposed to view from both sides and at the same time fully protected from injury, dust, dirt and the like.

We are aware that minor changes in the arrangement, construction, and combination of the several parts of our new wing may be made and substituted for those herein shown and described within the scope of the appended claims without departing from the nature and spirit of our invention.

Having thus described our invention, what we claim and desire to secure by Letters Patent is:

1. A wing for display racks comprising a substantially U-shaped outer frame formed of vertically-disposed members and a horizontally-disposed connecting member rigidly fixed to said vertically-disposed members adjacent the lower end thereof, one of said vertically-disposed members being provided at its opposite ends with supporting trunnions, an inner substantially U-shaped frame, channel-shaped in cross section, fitting within the area, and rigidly fixed to the members, of said outer frame and forming an open ended pocket for receiving the matter to be displayed, and a horizontally-disposed strengthening strip extending transversely around said frames adjacent their open ends; substantially as described.

2. A wing for display racks comprising an outer metallic substantially U-shaped frame formed of vertically-disposed tubular members and a horizontally-disposed connecting tubular member rigidly fixed to said vertically-disposed members adjacent the lower end thereof, one of said vertically-disposed members being provided at its opposite ends with supporting trunnions, an inner metallic substantially U-shaped frame, channel-shaped in cross section, fitting within the area, and rigidly fixed to the members, of said outer frame and forming an open ended pocket for receiving the matter to be displayed, and a horizontally-disposed strengthening strip extending transversely around said frames adjacent their open ends and fixed to the vertically-disposed members of said outer frame; substantially as described.

3. A substantially unitary wing for display racks comprising an outer substantially U-shaped metallic frame formed of vertically-disposed members and a horizontally-disposed connecting member welded and thereby rigidly fixed to said vertically-disposed members adjacent the lower end thereof, one of said vertically-disposed members being provided at its opposite ends with supporting trunnions, an inner substantially U-shaped frame fitting within the area, and welded; and thereby rigidly fixed to, the members, of said outer frame and forming an open ended pocket for receiving the matter to be displayed, and a horizontally-disposed strengthening strip extending transversely around said frames adjacent their open ends and welded, and thereby rigidly fixed to, the vertically-disposed members of said outer frame; substantially as described.

In testimony whereof, we have signed our names to this specification, in the presence of two subscribing witnesses.

LOUIS FELDMANN, Jr.
THEODORE E. CRECELIUS.

Witnesses:
EMIL MAYER,
Z. D. PINCUS.

---

Copies of this patent may be obtained for five cents each, by addressing the "Commissioner of Patents, Washington, D. C."